July 3, 1945. J. E. YOUNG 2,379,776
POWER TAKE-OFF
Filed June 24, 1944 3 Sheets-Sheet 1

INVENTOR.
Joseph E. Young
BY
A. D. T. Libby
Attorney.

July 3, 1945.   J. E. YOUNG   2,379,776
POWER TAKE-OFF
Filed June 24, 1944   3 Sheets-Sheet 2
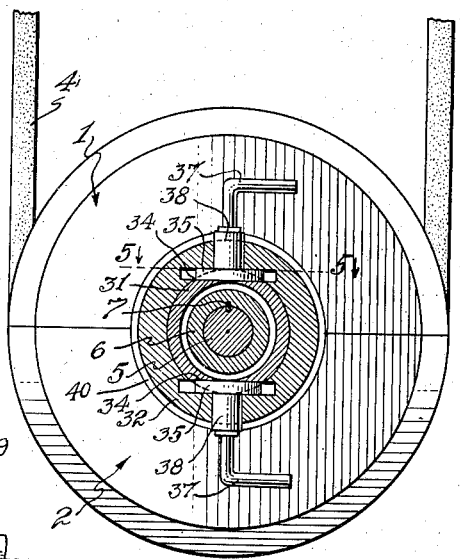
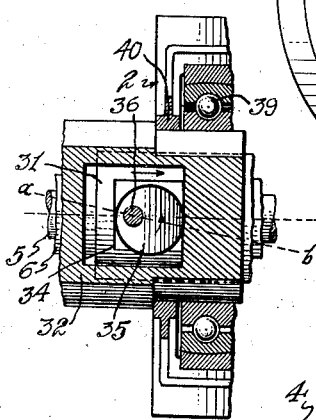
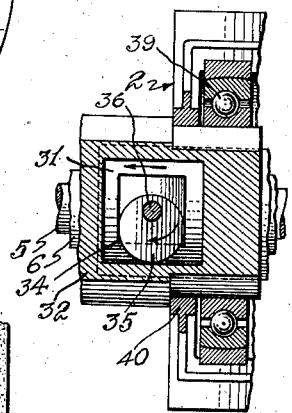
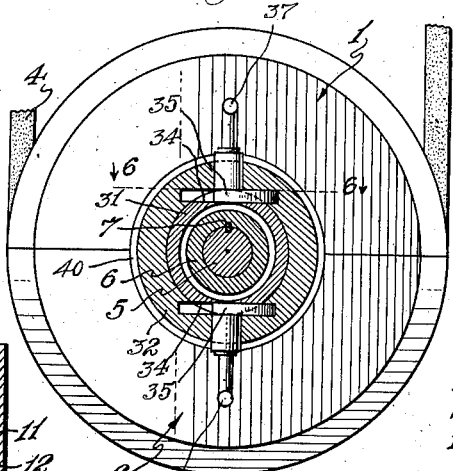
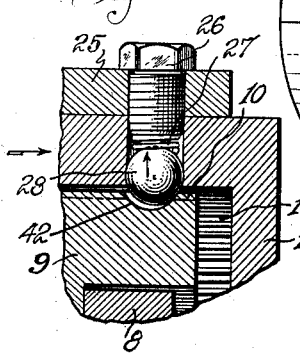
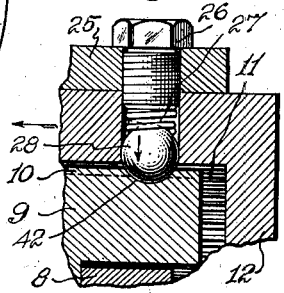
INVENTOR.
Joseph E. Young
BY
A. D. T. Libby
Attorney.

July 3, 1945.  J. E. YOUNG  2,379,776
POWER TAKE-OFF
Filed June 24, 1944  3 Sheets-Sheet 3
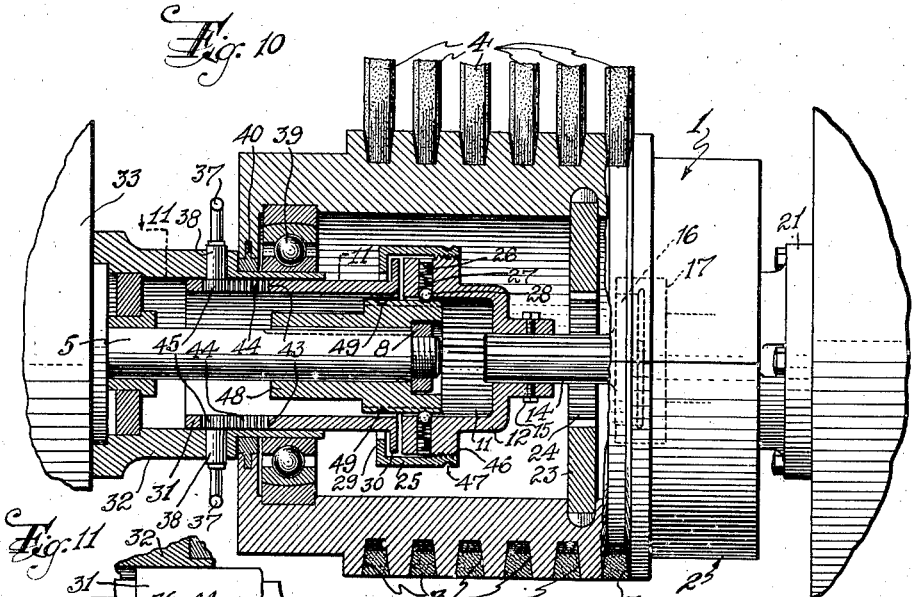
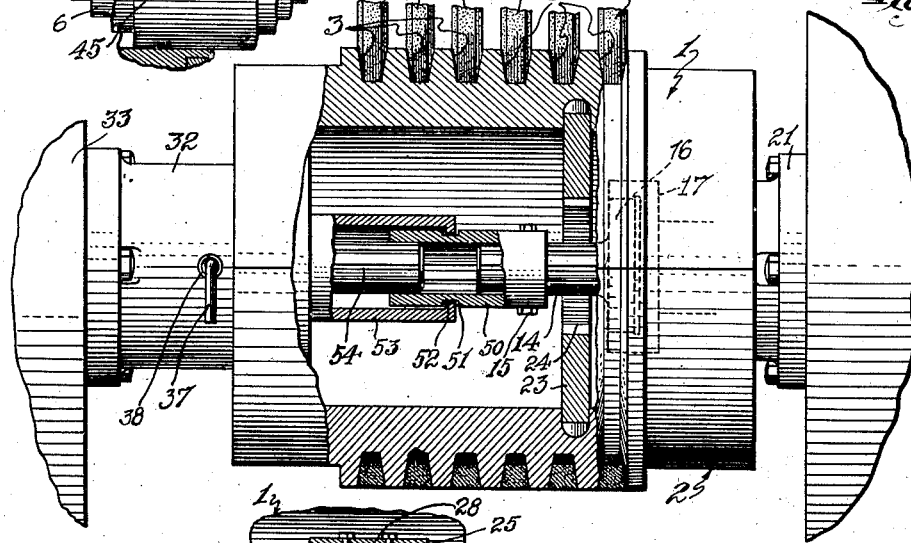
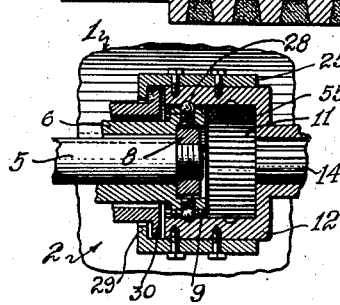
INVENTOR.
Joseph E. Young
BY
A. D. T. Libby
Attorney.

Patented July 3, 1945

2,379,776

UNITED STATES PATENT OFFICE 2,379,776

POWER TAKE-OFF

Joseph E. Young, Newark, N. J., assignor to Couse Laboratories, Newark, N. J., a partnership composed of Kibbey W. Couse and Murray Thompson Application June 24, 1944, Serial No. 541,942

8 Claims. (Cl. 74—11)

This invention relates to power take-offs which are adapted for many uses, especially on mobile machine shops.

On traveling machine shops, there are various types of machine tools and other apparatus which are required for making repairs in the field on farm machinery, trucks, automobiles, tanks and war equipment wherein the traveling machine shop is an essential piece of apparatus.

The machinery referred to requires a rotary drive from the engine which drives the vehicle, and while power take-off devices have been heretofore proposed and used on these types of vehicles, my present invention is directed to improvements in the power take-off structure.

One of the objects of my present invention is to provide a power take-off mechanism in which what might be termed the setting-up parts are out of contact with the rotating parts when they are in operation, thereby eliminating friction between the rotating parts and the setting-up or positioning parts, thus eliminating wear on the parts that do not rotate, as well as saving power which would be consumed if these parts of the take-off mechanism were in frictional engagement while power was being transmitted to the structure.

Another object of my invention is to provide a power take-off structure having a high degree of flexibility between the various parts of the structure.

My improvements are shown in the annexed drawings wherein:

Figure 3 is a view on the line 3—3 of Figure 1.

Figure 4 is a view on the line 4—4 of Figure 1, but with the camming parts turned at right angles from the position shown in Figure 3.

Figure 5 is a view on the line 5—5 of Figure 3.

Figure 6 is a view on the line 6—6 of Figure 4.

Figure 7 is a fragmentary view, partly in section and partly in elevation through one of the positioning means for separating its coacting rotary part from a corresponding cooperative non-rotatable part, the rotatable and non-rotatable parts being in frictional engagement.

Figure 8 is a view similar to Figure 7 but with the positioning means being in a position to separate the rotatable and non-rotatable parts from frictional engagement.

Figure 10 is a view similar to Figure 2, showing a modified form of gear-shifting means.

Figure 11 is a view on the line 11—11 of Figure 10.

Figure 13 is a part-elevational and part-vertical sectional view through a modified form of construction.

Figure 14 is a fragmentary sectional view showing a modified form of part of the structure shown in Figure 10.

Figure 1:
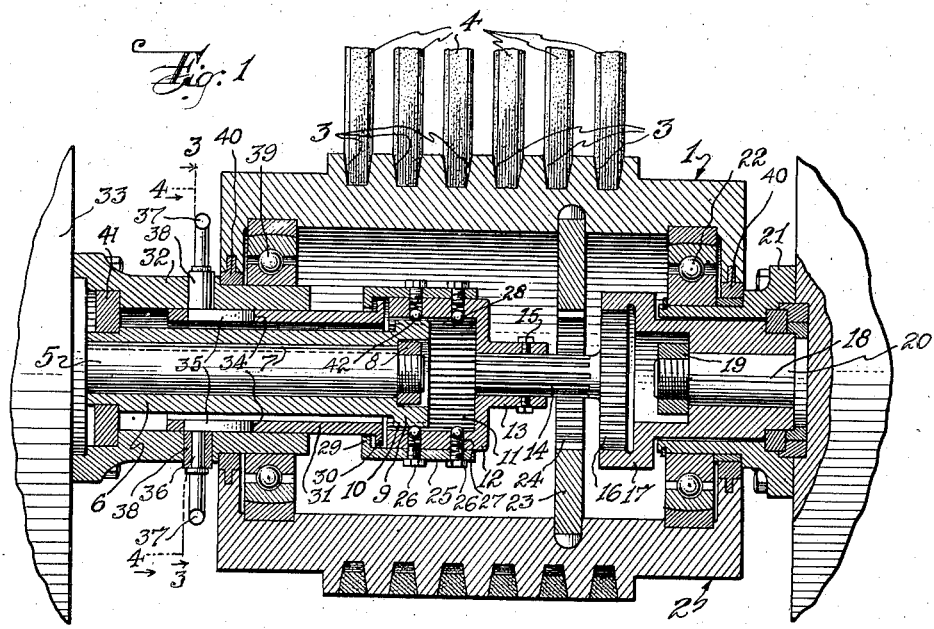
Figure 1 is a vertical longitudinal section through the power take-off structure.

Referring now to the details wherein like numbers refer to corresponding parts, 1 and 2 are top and bottom portions of a housing, which parts are fastened together in any satisfactory manner. The outer surface of the housing is provided with a plurality of V-shaped grooves 3, within which driving belt members 4 are positioned. Entering the casing from one end, is a driving shaft 5 drivingly carrying a sleeve 6, the driving connection being provided by a key 7 and a nut 8 on the threaded end of the shaft 5.

The inner end of the driving sleeve 6 terminates in a rim 9, the outer periphery of which is provided with gear teeth 10 that are in continuous mesh with gear teeth 11 formed on the inner wall of the member 12 having a projecting stem 13 which is carried on a splined stud 14, set screws 15 also being used to position the member 12 longitudinally on the stud 14. On one end of the stud 14 is fastened a gear 16 that is adapted to mesh with internal teeth on the member 17 keyed and fastened as by a key 18 and nut 19 to a driven shaft 20 which extends rearwardly to the differential of the vehicle. The member 17 is carried by a bearing support member 21 on which is positioned the inner race of a ball bearing 22, the outer race being supported in the housing members 1 and 2. Fastened to the inner periphery of the housing is a hollow annular ring 23 having gear teeth 24 in alignment with the gear teeth on the member 17, so that when the stud 14 and gear 16 are moved in the manner hereinafter explained, the gear 16 may be moved into mesh with the gear teeth 24 to turn the housing and the transmission belts 4.

In order to shift the longitudinal position of the stud 14 and gear 16, the member 12 is interconnected with a collar 25 through the medium of a plurality of screws 26, two sets of which are indicated in Figure 1. Each of the screws 26 goes through the collar 25 into the member 12 against a spring 27 that is in contact with a ball 28 which has a diameter and is so positioned in the member 12 that it cannot drop out when the rim 9 of the sleeve 6 is moved back and forth as will be later described.

Figure 2:
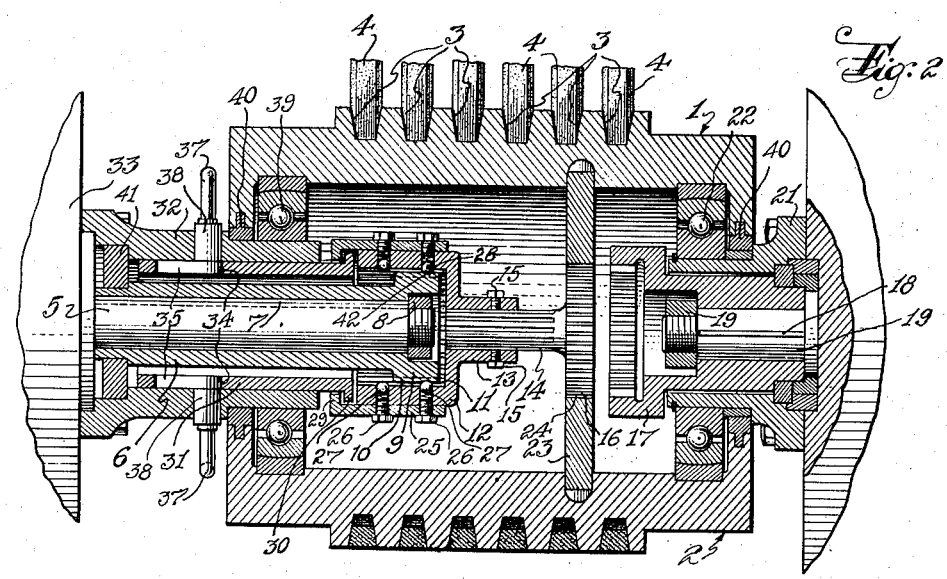
Figure 2 is a view similar to Figure 1 but with certain of the transmission parts in a different position of operation.
Figure 9:
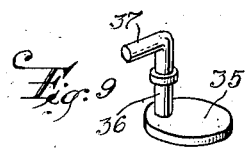
Figure 9 is a perspective view of one of the cam devices which is used in producing the gear shift shown in Figures 1 and 2.
Figure 12:
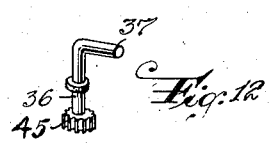
Figure 12 is a perspective view of one of the shifting levers with associated pinion of Figure 10.

The collar 25 has an annular flange 29 which is adapted to be engaged by a flange 30 on the cylindrical member 31 that is slidably positioned within the bearing support member 32 fastened to the bearing plate 33. The member 31 has oppositely disposed orifices or openings 34 in its side wall near one end, as indicated in Figures 1 and 2. Positioned within each of the openings 34, is a cam 35 having an operating stud 36 and an operating arm 37. The stud 36 is carried by a bushing 38 supported in the member 32 which supports the inner race of a bearing 39, the outer race of which is supported in the housing, the same as the bearing 22. It may be mentioned in passing that oil and dirt seals 40 are used at both ends of the structure, and likewise packing devices 41 are used at both ends of the structure so as to prevent leakage of oil which preferably fills the interior part of the housing after assembly.

In the operation of the structure shown in Figures 1 to 9 inclusive, preferably a common operating device moves the levers 37 into the position shown in Figures 1 and 3, whereby the cams 35 push the member 31 to the right so that its flange 30 engages the outer peripheral edge or rim of the member 12, causing it to move the stud 14 and the gear 16 into mesh with the gear teeth on the member 17, thereby transmitting rotary motion from the shaft 5 to the driven shaft 20. When the gear 16 has been moved to this position shown in Figure 1, the balls 28 (see Figures 1 and 7) which are in contact with the rim 9 are moved out of the annular groove 42 in the rim 9 about as indicated in Figure 7. When pressure or force is removed from the operating arms 37, the pressure of the springs 27 through the balls 28 will cause the member 12 and connected parts to move to the left, allowing the flange 30 of the member 31 to take up an intermediate position adjacent the flange 29 of the collar 25, so that there will be substantially no frictional engagement between the flange 30 and the edge of the member 12. A movement of a very few thousandths of an inch is sufficient clearance to eliminate friction between these particular parts, and this slight movement will not disturb the functioning of the gear 16. It will be understood that the cam 35 is mounted eccentrically with respect to the pin 36 as indicated by the dotted line a-b, so that movement of the member 12 to the left as above explained will readily move the member 31 against the cams 35 since these are not on a dead-center line when the gear shift has been made into the position shown in Figure 1.

In shifting the gear 16 into mesh with the teeth 24 on the member 23, the reverse operation takes place; i. e., the operating handles 37 with their respective cams are moved into the position shown in Figure 2. This moves the cylindrical member 31 so that its flange 30 engages the flange 29 to pull the member 12 and associated parts, including the gear, into the position shown in Figure 2. The balls 28 on the right-hand pair (see Figure 2) will perform the operation of moving the member 12 so that the two flanges 29 and 30 are in spaced relation as shown in Figure 2.

In Figure 10, in place of the cams 35, the slidable cylindrical member 31 has oppositely positioned openings 43 therein with gear teeth 44 on one side of the opening. A pinion 45 for meshing with these gear teeth is carried by the operating stud 36 which has the same operating arm 37. In this form of construction, the member 12 has an external screw thread 46 to receive screw threads on the collar member 25. To position the collar member in fixed position on the member 12, the material may be slightly upset at 47 after the parts are screwed into position. In place of the pairs of positioning means, such as the balls 28 used in the construction of Figures 1 and 2, a single ball 28 may be used while the sleeve member 48 has a pair of angular recesses 49 in which the ball 28 may function for the same purpose and in a similar manner as in Figures 7 and 8, this latter figure indicating the balls in normal operating position.

In operation, the structure of Figure 10 functions in a similar manner as already explained with respect to the construction of Figures 1 and 2.

In Figure 13, a somewhat differently shaped member 50 is carried on the screw stud 14 and has an annular groove 51 therein to receive an annular flange 52 in a cylindrical member 53 which may be operated by the cam structure of Figure 1, or the gear and pinion structure of Figures 10 and 11. In this construction, the inner end of the driving shaft 5 has splines 54 to cooperate with similar splines in the member 50, thereby not requiring the sleeve 6 or its counter-part 48. It is to be understood that the width of the groove 51 is wide enough so that the flange 52 makes little or no contact with the edge of the groove when the structure is transmitting power; consequently, there will be an extremely small amount of friction at this point.

Figure 14 is a modification of the combination of the parts 12 and 25 in that the springs and balls 27 and 28 are carried in the rim 9 of the sleeve 6, while the member 12 has annular recesses 55 to receive the positioned balls which function in the same manner as described with respect to Figures 7 and 8.

What I claim is:

1. A power take-off structure including a cylindrical casing rotatably mounted at opposite ends on suitable supports, the casing being adapted to receive power-transmitting means on its exterior surface and having interally positioned clutch teeth, a driving shaft entering the casing at one end, a driven shaft entering the casing at the opposite ends and both shafts terminating within the casing, sleeves drivingly carried on each of said shafts and having annular rim portions, that portion of the sleeve on the driven shaft having internal clutch teeth, while the sleeve on the driving shaft has external clutch teeth, a cup-shaped member having internal clutch teeth in continual mesh with the clutch teeth on the driving sleeve, a flanged collar carried on the outer periphery of the body of the cup-shaped member, an elongated cylindrical member slidably carried within one of said supports and having an annular flange on its inner end positioned between the end of the cup-shaped member and the flange on said collar, said cylindrical member having openings in its wall at the end opposite to its flange, cams positioned in said openings, means connected to said cams and extending through the support carrying the cylindrical member for turning the cams and thereby sliding back and forth the cylindrical member and the members engaged by its flange, said cup-shaped member having a projecting stem, a gear type clutch having a stud extending into said stem and fastened thereto, whereby when the aforesaid slidable parts are moved, the said gear type clutch may be connected either to the driven sleeve or to the internal clutch teeth fastened to the casing.

2. A power take-off structure including a cylindrical casing rotatably mounted at opposite ends on suitable supports, the casing being adapted to receive power-transmitting means on its exterior surface and having internally positioned clutch teeth, a driving shaft entering said casing at one end, a driven shaft entering the casing at the opposite ends and both shafts terminating within the casing, sleeves drivingly carried on each of said shafts and having annular rim portions, that portion of the sleeve on the driven shaft having internal clutch teeth, while the sleeve on the driving shaft has external clutch teeth, a cup-shaped member having internal clutch teeth in continual mesh with the clutch teeth on the driving sleeve, a collar fastened onto the outer periphery of the body of the cup-shaped member, an elongated cylindrical member slidably carried within the driving end support and having means at its inner end to operatively engage either the end of the cup-shaped member or the collar to transmit movement thereto, and means cooperating with the outer end of said cylindrical member to slide it longitudinally of the driving shaft, a gear type clutch having an extending stud, said cup-shaped member having means for drivingly engaging said stud, whereby when the aforesaid slidable parts are moved, the said gear type clutch may be connected either to the driven sleeve or to the internal clutch teeth fastened to the casing.

3. A power take-off structure as set forth in claim 2, further characterized in that resiliently mounted means are provided and located so as to coact between the driving sleeve and the cup-shaped member so as to move the cup-shaped member and connected parts, after a clutch shift has been made, sufficiently to eliminate substantially all the friction between the said elongated cylindrical member and the rotatable parts which are slidably moved by said member.

4. A power take-off structure as set forth in claim 2, further characterized in that said means for transmitting sliding movement to said elongated cylindrical member comprises a plurality of cams positioned in openings in the wall of said elongated member, with operating rods fastened to the cams and extending through said support member.

5. A power take-off structure as set forth in claim 2, further characterized in that said means for transmitting sliding movement to said elongated cylindrical member comprises a plurality of gears of the clutching type positioned in openings in the wall of said elongated member, the material forming one side of the openings having clutch teeth to receive the pinions, and operating rods carrying the pinions and extending through said support member.

6. A power take-off structure including a cylindrical casing rotatably mounted at opposite ends on suitable supports, the casing being adapted to receive power-transmitting means on its exterior surface and having internally positioned clutch teeth, at least a driving sleeve entering the casing at one end and terminating in an annular rim with external clutch teeth thereon, at least a driven sleeve entering the casing from the opposite end and terminating in an annular rim with internal clutch teeth thereon, a gear type clutch combination comprising a pair of interconnected gears of the clutching type, one of which is continually in mesh with the clutch teeth on the driving sleeve, while the other is adapted to engage either the clutch teeth on the casing or the driven sleeve, a slidable member carried within the support at the driving end of the structure but spaced from the driving sleeve, with means extending exteriorly through the support for sliding said member, means carried by one of the gears of the clutching type of said gear type clutch combination to be engaged by said slidable member when it is moved in one direction to move the gear type clutch combination in that direction, while the slidable member engages directly the said one gear type clutch to move the combination in another direction.

7. A power take-off structure as set forth in claim 6, further characterized in that means are provided for slightly shifting the gear type clutch combination from the positions into which they are moved by said slidable member so the rotatable gear type clutch combination will be substantially free from frictional engagement with said slidable member.

8. A power take-off structure including a cylindrical casing rotatably mounted at opposite ends on suitable supports, the casing being adapted to receive power-transmitting means on its exterior surface and having internally positioned clutch teeth, a drive shaft entering the casing at one end, a driven member entering the casing from the opposite end and having clutch teeth at its inner end, a gear type clutch having an extending stud and located so as to be moved into engagement with either set of clutch teeth, driving means fastened to said stud, means fastened to said stud for making a driving connection between the drive shaft and said driving means, a cylindrical, elongated slidable member extending through the drive end of the casing and into operative engagement with the means for making a driving connection between the drive shaft and the driving means, and rotatable means extending radially through the drive end support for moving said slidable member.

JOSEPH E. YOUNG.